United States Patent [19]
Hobson

[11] 3,951,580
[45] Apr. 20, 1976

[54] POSITIVE PRESSURE MOLD
[75] Inventor: Carroll D. Hobson, Goshen, Ind.
[73] Assignee: Goshen Rubber Co., Inc., Goshen, Ind.
[22] Filed: Jan. 23, 1975
[21] Appl. No.: 543,372

Related U.S. Application Data
[63] Continuation of Ser. No. 400,239, Sept. 24, 1973, abandoned.

[52] U.S. Cl............................. 425/233; 425/395; 425/408; 425/812
[51] Int. Cl.² ............................................ B29G 1/00
[58] Field of Search ............ 425/233, 395, 408, 812

[56] References Cited
UNITED STATES PATENTS

| | | | |
|---|---|---|---|
| 806,472 | 12/1905 | Jeffrey | 425/395 X |
| 1,454,506 | 5/1923 | Christenson | 425/395 X |
| 2,964,791 | 12/1960 | McFarland | 425/233 X |
| 3,008,235 | 11/1961 | Royer et al. | 425/233 X |
| 3,193,884 | 7/1965 | Haynie et al. | 425/812 X |
| 3,357,072 | 12/1967 | Sutphin | 425/812 X |
| 3,717,693 | 2/1973 | Kohl et al. | 425/395 X |
| 3,746,491 | 7/1973 | Daly et al. | 425/233 |

Primary Examiner—Granville Y. Custer, Jr.
Assistant Examiner—Howard N. Goldberg
Attorney, Agent, or Firm—Olson, Trexler, Wolters, Bushnell & Fosse, Ltd.

[57] ABSTRACT

In accordance with the present invention a positive pressure mold is provided wherein the mold cavity is sealed during the initial movement of the dies. The entrapped air is caused to escape at a controlled rate as the dies move together, building up a sufficient air pressure between the dies to distribute the workpiece or "preform" throughout the die cavity.

9 Claims, 12 Drawing Figures

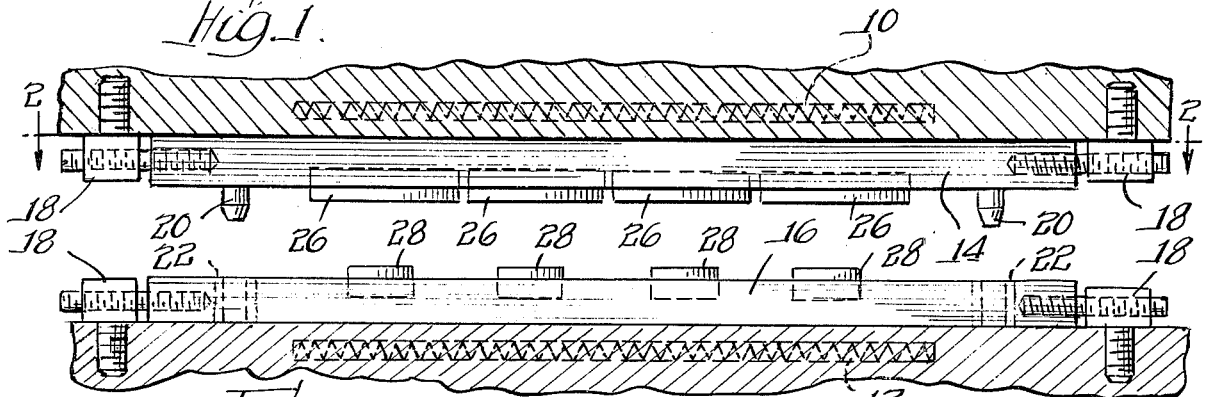
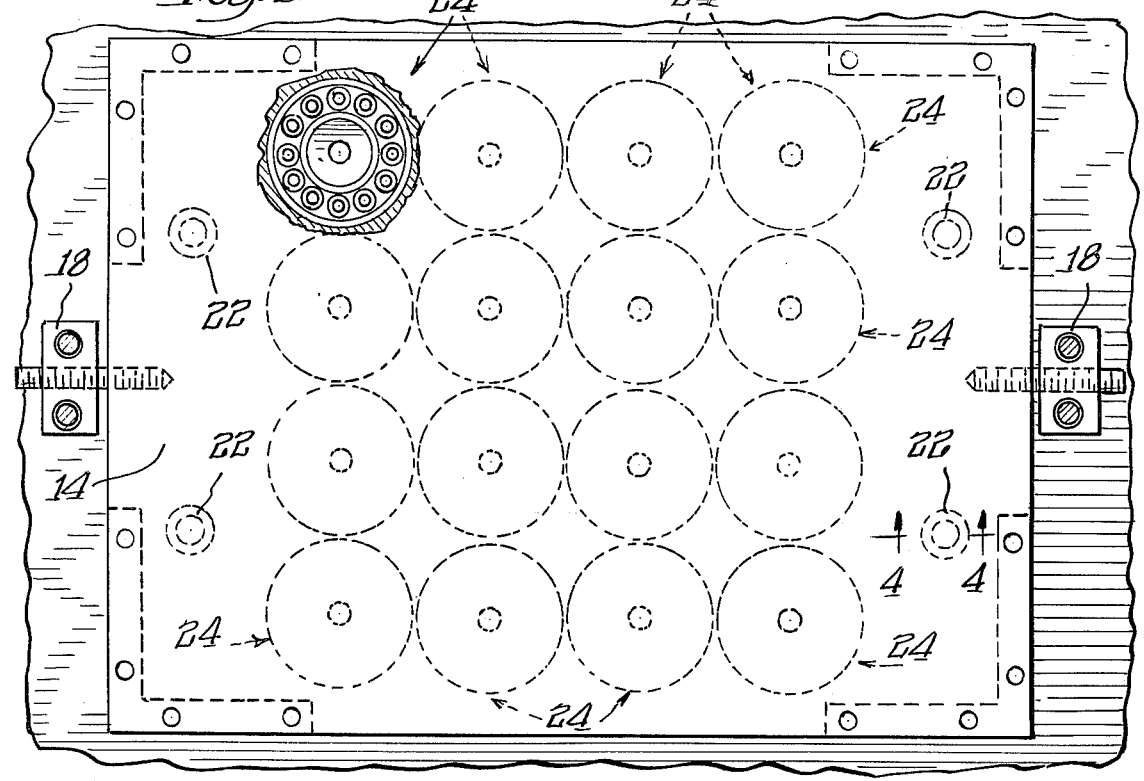
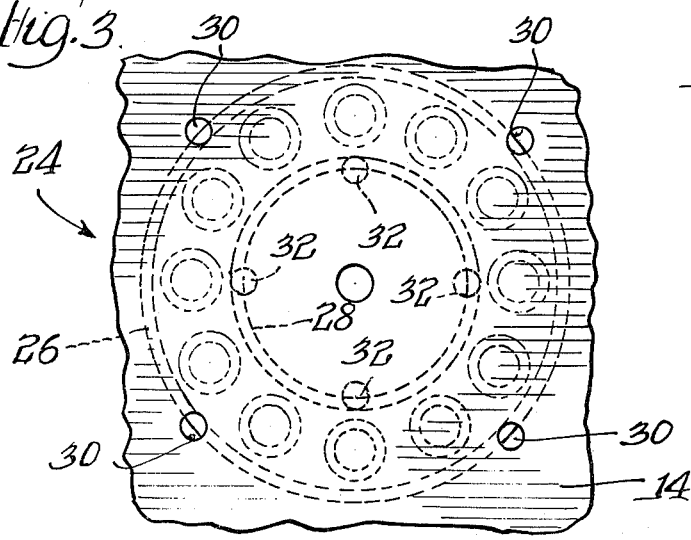
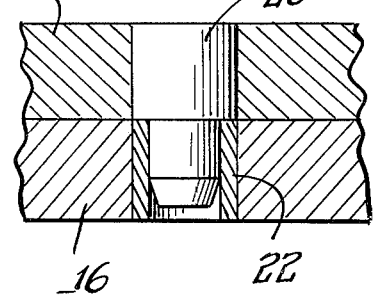

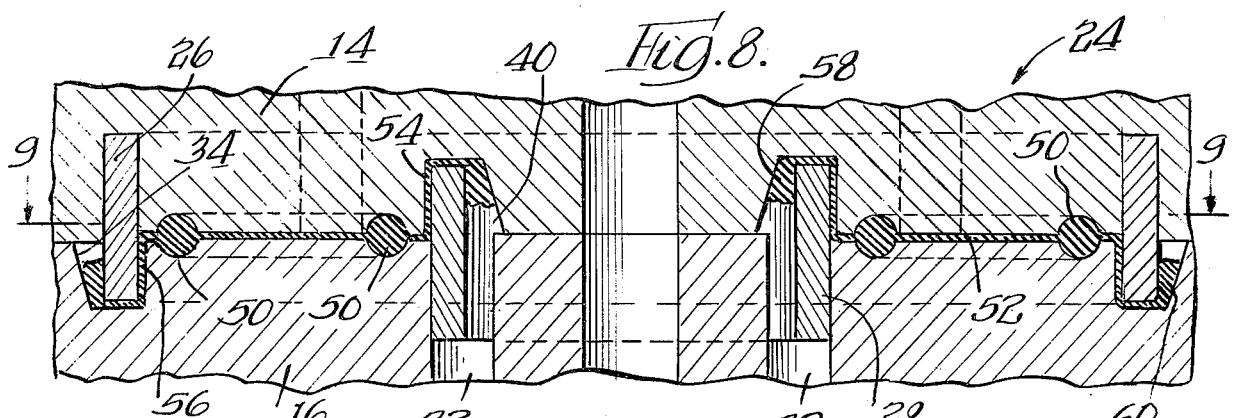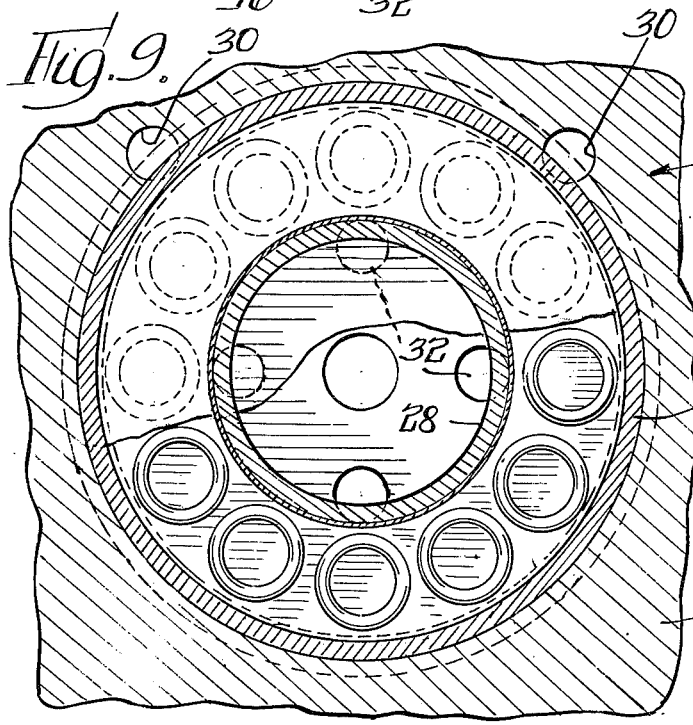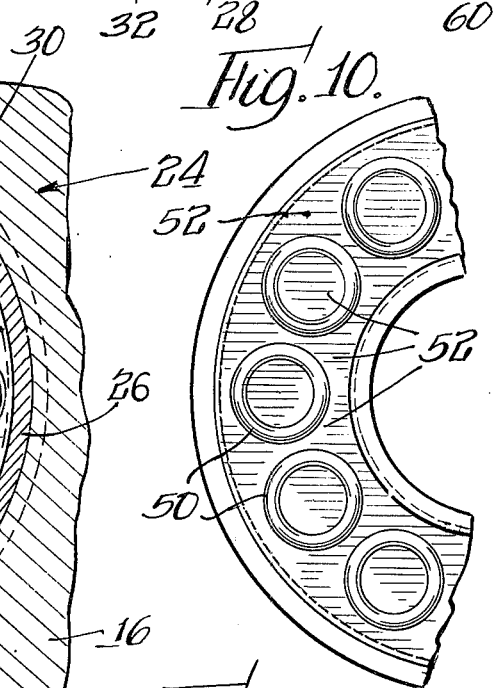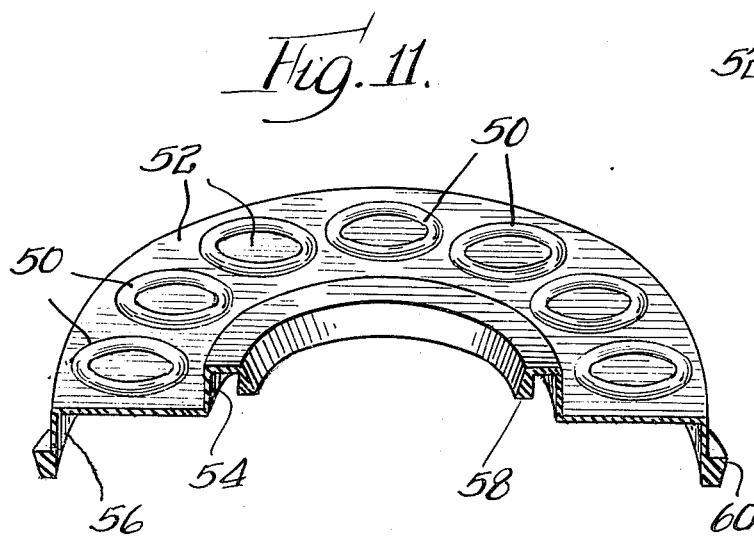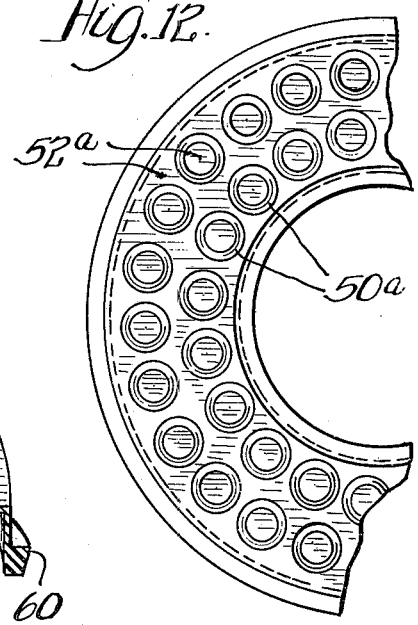

POSITIVE PRESSURE MOLD

This is a Continuation Application of application Ser. No. 400,239, filed Sept. 24, 1973, abandoned.

DISCLOSURE OF THE INVENTION

This invention relates to compression molding, and concerns particularly a positive pressure mold wherein air pressure is utilized to distribute the workpiece within the mold cavity.

BACKGROUND OF THE INVENTION

In conventional compression molding it is customary to deposit a preform of predetermined shape and size within the mold cavity, the preform being composed of the material to be molded into the completed molded article. The consistency of the molded material itself is relied upon to cause distribution of the molded material throughout the die cavity. An overflow well circumferentially surrounds the mold, and the excess material overflows into this well, and becomes waste.

In accordance with the foregoing, it is necessary that the preform have a geometry sufficiently similar to that of the mold, so that the molded material will distribute itself sufficiently throughout the mold cavity. Also, when molds with multiple mold cavities are used, it is necessary that an individual preform be deposited within each such mold cavity. This results in a considerable amount of waste, because each cavity is provided with its own overflow well.

Another problem which results from the conventional molds and methods referred to above is that certain consistency limitations are imposed upon the molded material, because the material itself is used to cause the distribution of the material throughout the mold. Frequently a material having different viscosity characteristics would be preferred for the particular application, thus requiring the use of different molding methods, such for example as injection molding or the like. A still further difficulty with the molds referred to above, is that upon occasion the mold cavity may not become completely filled with the molded material due to improper or inadequate flow. This generally requires that excess material be used in the preform, to insure complete filling of the mold, which in turn results in excess waste.

SUMMARY OF THE INVENTION

In accordance with the present invention, the mold is so constructed that it becomes dynamically sealed during the initial movement of the die plates, so that upon continued movement of the die plates air pressure of considerable magnitude is built up within the mold cavity, such air pressure being used as the distribution means for distributing the molded material uniformly and properly throughout the mold cavity space. The entrapped air is permitted to escape from the mold cavity, at a controlled rate, so correlated with the speed of movement of the die plates, that a desired air pressure is caused to be built up within the mold cavity. The shape of the preform becomes a matter essentially of inconsequence. It is only necessary that a preform having a sufficient initial volume, or weight, be used, and this may be accurately correlated with the volume of the mold cavity, to minimize waste. A single preform may be used for a multiple section mold which minimizes handling, and speeds up the molding process. A wide range of molded materials may be used, inasmuch as the viscosity or flow characteristics of the molded material are not relied upon to fill the cavity of the mold.

OBJECTS OF INVENTION

It is accordingly an object of the present invention to provide an improved mold structure, particularly for use with compression molding.

A further object of the invention is to provide an improved mold which minimizes waste.

Another object of the invention is to provide an improved mold which minimizes handling time and costs.

A still further object of the invention is to provide an improved mold, particularly adapted for compression molding, which utilizes means other than the molded material for causing distribution of the material within the mold, whereby to permit the use of a wider range of molding materials.

Still another object of the invention is to provide an improved mold which minimizes the required accuracy in the size and shape of the preform of the molded material.

Various other objects, advantages and features of the invention will be apparent from the following specification, when taken with the accompanying drawings, wherein certain preferred embodiments of the invention are set forth for purposes of illustration.

BRIEF DESCRIPTION OF THE DRAWINGS

FIG. 1 is a side elevation of a die set utilizing molds constructed in accordance with and embodying the principles of the present invention;

FIG. 2 is a plan section, on the line 2—2 of FIG. 1, a part of the upper mold being broken away to show one cooperative mold section or cavity;

FIG. 3 is a plan view, on an enlarged scale, of one of the mold cavities shown in FIG. 2;

FIG. 4 is an enlarged detail view of one of the alignment or dowel pins;

FIG. 8 is a view, similar to FIG. 7, but on a further magnified scale to more particularly illustrate the operation, and the workpiece;

FIG. 9 is a view similar to FIG. 3, but on a further enlarged scale, taken as indicated by the line 9—9 of FIG. 8, and with parts broken away;

FIG. 10 is a partial top view of the workpiece;

FIG. 11 is a partial perspective view of the workpiece; and

FIG. 12 is a partial plan view, similar to FIG. 10, but showing a modified form of molded part.

DETAILED DESCRIPTION

Figure 5:
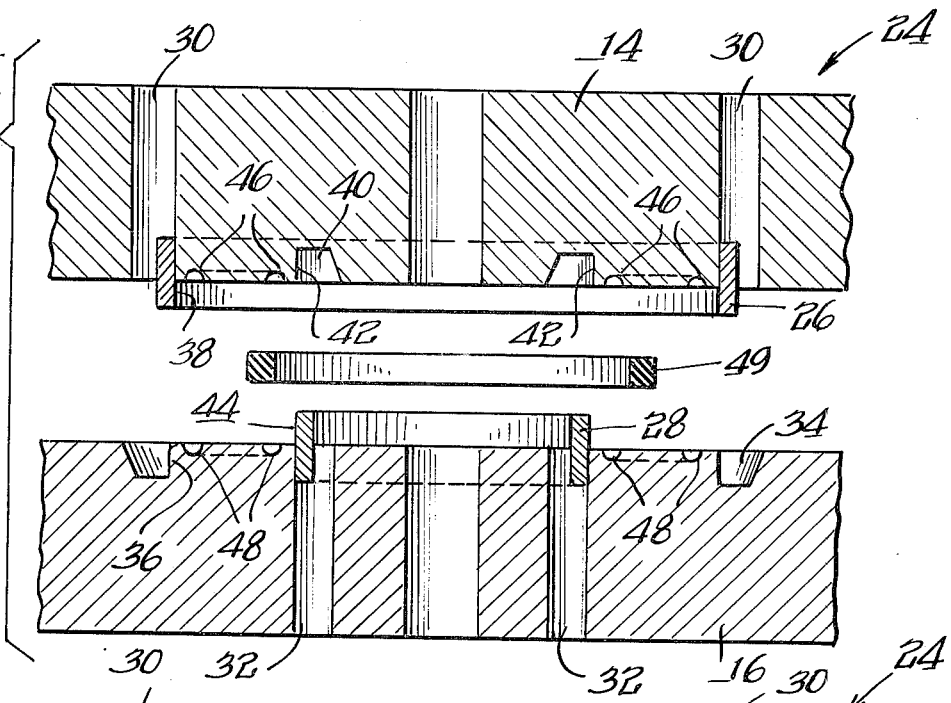
FIG. 5 is a cross-sectional view, on a further enlarged scale, of a pair of cooperative molds forming one mold cavity, the molds or mold plates being shown in their separated or initial position, and with the preform being shown diagrammatically therebetween.

Referring more particularly to the drawings, in FIG. 1 there is shown a pair of heated dies 10 and 12 provided with mold plates 14 and 16, respectively, constructed in accordance with the invention. The mold plates are held to the dies by suitable conventional holding and adjusting means, as indicated in FIG. 1 by the reference numeral 18.

Referring to FIG. 2, it will be seen that the mold plates are composed of a plurality of mold cavities, there being sixteen mold cavities in the particular embodiment shown. Conventional alignment means for the mold plates may be provided, such means in the particular embodiment shown comprising dowel pins 20 provided in the upper plate, and dowel pin cavities 22 provided in the lower mold plate, one cooperative dowel pin and cavity structure being illustrated in FIG. 4.

One mold cavity assembly is more particularly illustrated in FIGS. 3–9, and reference will first be made to FIG. 5. The particular mold section illustrated is the one shown at the upper left, in FIG. 2, and indicated by the general reference numeral 24.

Referring to FIG. 5, in accordance with the invention, the upper mold plate 14 is provided with a ring member 26, press-fitted into an annular receiving recess formed into the plate. Similarly a ring member 28 is press-fitted into an annular recess formed in the lower mold plate 16. A series of four holes 30, FIGS. 3, 5 and 9, is provided in the upper mold member 14 for the reception of a suitable tool, such as a punch or the like, whereby the ring-member 26 may be removed from the mold plate 14, as for replacement and repair. In a similar manner, the lower mold plate 16 is provided with a series of four holes or openings 32, FIGS. 3, 5 and 9, whereby the lower ring member 28 may be removed from its press fit into the mold plate 16.

Figure 7:
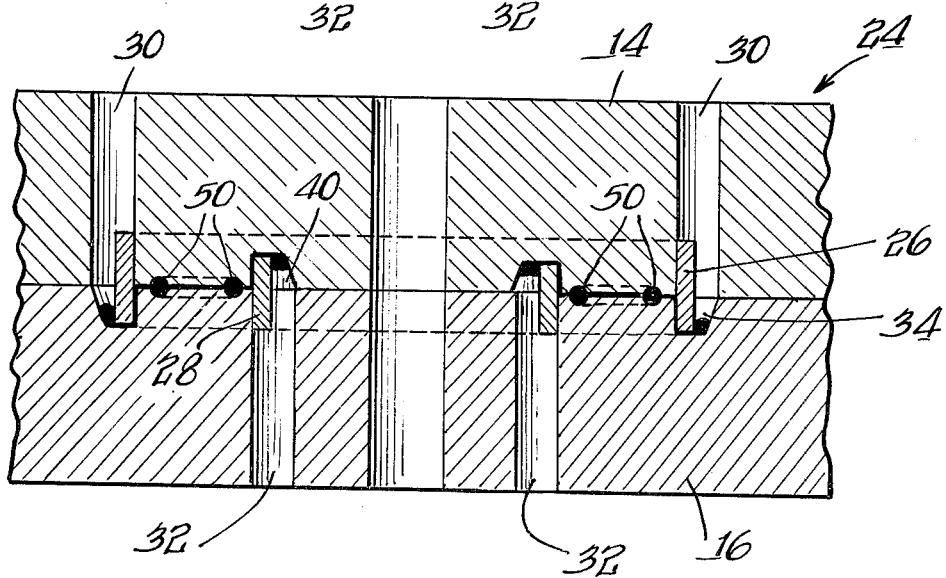
FIG. 7 is a view of the structures of FIGS. 5 and 6, showing the mold plates in completely closed position.

Mold plate 16 is further provided with an annular groove or recess 34, adapted to receive the ring-member 26 of the upper mold plate, when the mold plates are brought into cooperative engagement as shown in FIG. 7. The inner annular face 36 of the groove 34 is accurately formed for cooperation with the inner face 38 of the ring-member 26, these parts thus providing a controlled clearance therebetween, on the order of a few thousandths of an inch, for a purpose which will presently be described.

In a similar manner the upper mold plate 14 is provided with an annular groove or recess 40 therein, to receive the ring-member 28 when the mold plates are brought together, the groove 40 having its outer face 42 accurately formed to provide a controlled clearance space with the outer face 44 of the ring-member 28.

Ring-member 26, and its cooperative groove 34, are larger in diameter than ring-member 28 and its cooperative groove 40, the two ring and groove assemblies thus providing an enclosed space therebetween, when the mold plates are brought into cooperative engagement. Between the ring-members are the cooperative workpiece cavities indicated at 46 in the upper moldplate, and at 48 in the lower mold-plate, these cavities forming means for the molding of a plurality of O-rings 50, FIGS. 10 and 11, in the particular embodiment shown.

Figure 6:
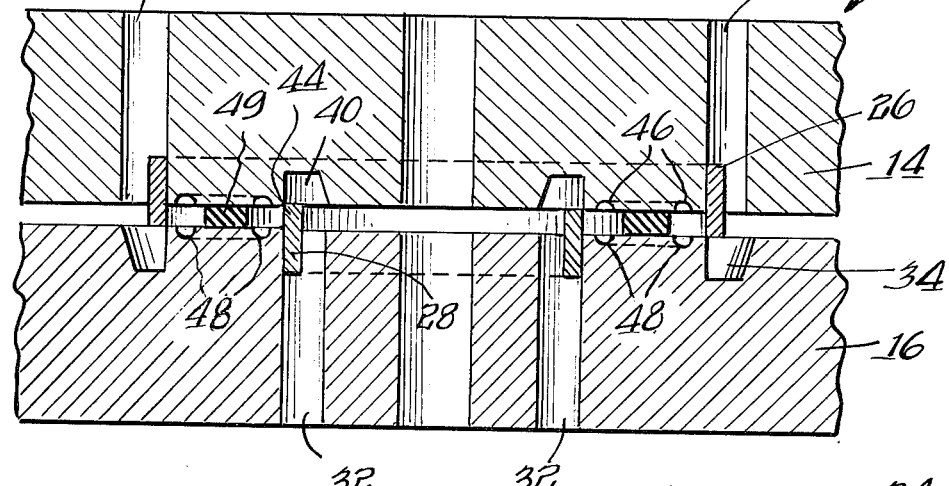
FIG. 6 is a view of the structure of FIG. 5, showing the mold plates in partially closed position.

Referring to FIG. 6, it will be seen that as the moldplates 14 and 16 are brought together, at a predetermined point in the closing operation, ring-member 26 becomes cooperative with its receiving channel 34, and ring-member 28 becomes cooperative with its receiving channel 40, in a manner so as to provide a closed air chamber between the ring-members, within which the workpiece is disposed. The workpiece or preform is indicated diagrammatically in suspended position in FIG. 5, designated by the reference numeral 49. It is designated in its initial clamped position in FIG. 6.

The mold-plates 14 and 16 are illustrated in their completely closed position in FIG. 7, and they are similarly shown in the enlarged view, FIG. 8, certain of the clearances being shown in somewhat exaggerated form. It will be seen that when the mold-plates 14 and 16 have been brought into final closed position, there is a slight space clearance therebetween, whereby to receive and form a web, indicated by the reference numeral 52, within each O-ring 50, and therebetween, as best shown in FIG. 10. In fact, the web 52 forms a continuous flat annular ring, within which the respective O-rings 50 are formed, as shown. As also shown in FIG. 8, the workpiece further has an upstanding annular web 54 disposed along the controlled clearance space along the outer face of ring-member 28, and a depending web 56 disposed along the controlled clearance space at the inner face of ring-member 26, which clearance spaces have been heretofore described.

The waste material from web 54 is received as indicated at 58 into the annular groove 40, whereas the waste material from the depending web 56 is received as indicated at 60 into the channel or recess 34 of the lower mold member 16. The workpiece parts, as above described, are also illustrated in the perspective view, FIG. 11.

The molding operation, and the action of the parts, will be best understood from the sequential views, FIGS. 5–7, and from FIG. 8. The preform 49 is first placed into position between the mold plates. As the plates are brought into the position of initial cooperation, as seen in FIG. 6, the preform is entrapped within an enclosed space defined by the cooperative mold plates 14 and 16, and the cooperative ring-members 26 and 28, as shown. Upon the further closing movement of the mold plates, into the position of FIG. 7, the entrapped air is compressed, and the compressed air is permitted to escape, at a controlled rate, through the annular clearance spaces provided between the inner face 38 of ring-member 26 and its cooperative groove 36, and through the clearance space between the outer face 44 of ring-member 28 and its cooperative groove 40 in the upper die or mold member. By the proper correlation of the size of these clearance spaces with the speed of closing movement of the dies, the entrapped air may be brought to a suitable high pressure. In an illustrative example, the annular clearance spaces along the faces of the ring-members may be on the order of 0.005 to 0.008 inches, and the pressure of the entrapped air may reach 3000 p.s.i. As will be understood, the desired clearance space depends upon the speed of movement of the closing mold plates, and the size of the cavity in which the air is trapped, the clearance space thus being adjusted and correlated so as to provide a desired high air pressure, depending in part upon the material of the preform 49, and the particular compression molding operation involved. Again, in an illustrative embodiment, the curing time of the workpiece may be from two to four and a half minutes at 330° F. to 380° F., such times and temperatures again being illustrative in a particular embodiment, as for example with rubber O-rings.

It will be seen that the objects and advantages heretofore mentioned have been achieved. The high pressure of the entrapped air effects a distribution of the material to be molded as for example rubber or the like, throughout the space between the mold-plates, thereby effecting an insured distribution of the molded material completely throughout the mold cavities. The clearance spaces along the surfaces of the ring-members are sufficiently small so that a build-up of air pressure is insured prior to the complete formation of the webs 54 and 56, and this in turn insures that there will not be an unequal distribution of the workpiece material, and that the webs and workpiece cavities ultimately will be completely filled and the workpiece completely formed. The flow characteristics of the workpiece material itself are of minimum significance, inasmuch as the high air pressure insures the proper distribution of the workpiece material. Stated another way, the air clearance spaces are sufficiently small so that the build-up of a high air pressure is insured, notwithstanding an initial erratic material distribution of the workpiece, which in turn insures by reason of such high air pressure that the workpiece will ultimately be completely and properly formed.

A plurality of work cavities may be filled from a single preform, there being a considerable number of O-rings formed from a single preform in the particular embodiment described. Thus the placement of multiple preforms to achieve the molding of multiple parts is not required. Also, by reason of the high air pressure, the preform need not be accurately shaped, it being necessary only that the preform has sufficient material volume, or weight, to completely fill the mold cavity, and the volume of the mold cavity when the mold is completely closed, may be accurately calculated and determined. Thus waste is minimized, and there is economy in time and labor in the formation and placement of the preform. It has been found that a preform of widely different geometric configuration will suffice.

The connecting webs 52, 54 and 56 are relatively thin, on the order of a few thousandths of an inch, and thus the O-rings or workpieces 50 may be readily separated by conventional freezing and tumbling processing.

In FIG. 12 a modified embodiment is illustrated. In this instance the O-rings, indicated at 50a, are smaller, illustrating how a large number of molded articles may be formed within a single interconnected mold cavity, in accordance with the principles of the invention. The interconnecting web 52a, functions and is formed in the manner as previously described with reference to the web 52.

As will be understood, molded articles of various shapes and size may be formed in accordance with the present invention. The thickness of the web 52 may be controlled either by bringing the mold plates 14 and 16 into engagement with fixed stops, or the web thickness may be controlled by limiting the approach of the mold-plates by the pressure of the entrapped air. It has been found that the web 52 may be made as small as 0.001 inches in thickness.

In the embodiment previously described the rings 26 and 28 have been illustrated as being circular in geometry, but they may be made in any desired shape so long as they form a chamber for the entrapped air pressure.

The invention claimed is as follows:

1. A positive pressure mold for compression molding comprising a pair of cooperative mold parts relatively movable towards and away from each other, barrier means including two sets of circumferentially disposed wall and groove means on said mold parts forming an air entrapment mold chamber as said mold parts are moved toward each other, and means forming an air escapement passage of controlled size operative during continued movement of said mold parts toward each other to cause a predetermined pressure to be reached by air entrapped within said chamber as said mold parts continue said motion toward each other.

2. A positive pressure mold for compression molding comprising a pair of cooperative mold parts relatively movable toward and away from each other, barrier means including a pair of circular walls and a pair of cooperative grooves on said mold parts, disposed in radially displaced relation and forming an air entrapment mold chamber as said mold parts are moved toward each other, and means forming an air escapement passage of controlled size operative during continued movement of said mold parts toward each other to cause a predetermined pressure to be reached by air entrapped within said chamber as said mold parts continue said motion toward each other.

3. A positive pressure mold according to claim 2 wherein said barrier means includes at least two ring members concentrically mounted on said mold parts, each ring member providing one of said circular walls.

4. A positive pressure mold according to claim 3 wherein said ring members are mounted on and partially within said mold parts by press fits.

5. A positive pressure mold according to claim 4 wherein a mold part carrying a ring member is provided with a hole for the reception of a tool for driving the ring member from the mold part for replacement and repair.

6. A positive pressure mold according to claim 3 wherein each groove is provided with an annular face adapted for cooperation with a face of a ring member, the ring member and the groove face providing, when the mold parts are moved toward each other, a controlled clearance forming said air escapement passage of controlled size.

7. A positive pressure mold according to claim 6 wherein one ring member is carried in one mold part and the other ring member is carried on the other mold part, and wherein one groove is provided with an inner annular face and the other groove is provided with an outer annular face for cooperation with the respective ring members to provide two controlled clearances each forming an air escapement passage, the air escapement passages extending in opposite directions along paths parallel to the direction of relative motion of the mold parts.

8. A positive pressure mold for compression molding comprising a pair of cooperative mold parts relatively movable toward and away from each other, barrier means including at least one set of circumferentially disposed wall and groove means on said mold parts forming an air entrapment mold chamber as said mold parts are moved toward each other, and means forming an air escapement passage of controlled size operative during continued movement of said mold parts toward each other to cause a predetermined pressure to be reached by air entrapped within said chamber as said mold parts continue said motion toward each other.

9. A positive pressure mold for compression molding comprising a pair of cooperative mold parts relatively movable toward and away from each other, barrier means including at least one circular wall and at least one cooperative groove on said mold parts, forming an air entrapment mold chamber as said mold parts are moved toward each other, and means forming an air escapement passage of controlled size operative during continued movement of said mold parts toward each other to cause a predetermined pressure to be reached by air entrapped within said chamber as said mold parts continue said motion toward each other.

* * * * *